W. J. Towne,
Steam-Engine Packing.
Nº 84,022.     Patented Nov. 10, 1868.

Witnesses:

Inventor:
W. J. Towne.

UNITED STATES PATENT OFFICE.

WILLIAM J. TOWNE, OF NEWTONVILLE, MASSACHUSETTS, ASSIGNOR TO SILVER LAKE MANUFACTURING COMPANY, OF SAME PLACE.

Letters Patent No. 84,022, dated November 10, 1868.

IMPROVED PACKING FOR JOINTS OF STEAM-ENGINES.

The Schedule referred to in these Letters Patent and making part of the same.

*To all whom it may concern:*

Be it known that I, WILLIAM J. TOWNE, of Newtonville, in the county of Middlesex, and State of Massachusetts, have invented certain Improvements in Packing for the Joints of Steam-Engines, and pumps, stuffing-boxes, expansion-joints, &c., of which the following is a full, clear, and exact description, reference being had to the accompanying drawings, making part of this specification, in which—

Figures 1, 2, 3, and 4 represent pieces of my improved packing, partially in section, and partially in elevation.

This invention consists in the application, to the exterior surface of packing, composed of powdered and fibrous materials, of a glazing or coating of a glutinous substance, either alone or mixed with a powdered mineral substance or substances, which prevents the escape of the powder contained in the packing, when it is being handled or during its transportation, the glazing or coating also serving to retain the powdered mineral substance on the exterior surface of the packing, as required to bring it into immediate contact with the metallic surface to which it is applied; and my invention also consists in the application, to the exterior surface of ordinary packing, composed of fibrous material only, of a glazing or coating composed of a glutinous substance and a powdered mineral substance or substances, combined together; and my invention furthermore consists in a packing, composed of fibrous material, a powdered mineral substance or substances, and a glutinous substance, when the whole are intimately mixed together during the process of braiding, twisting, or plaiting, the glutinous substance and powdered mineral being in the form of a paste.

To enable others skilled in the art to understand and use my invention, I will proceed to describe the manner in which I have carried it out.

Figure 1:
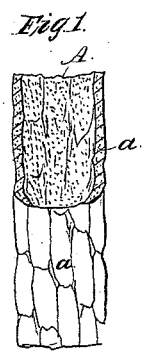
Figure 2:

In fig. 1 of the said drawings, A represents a piece of packing, composed of cotton or other fibrous material, braided, twisted, or plaited, and combined with soapstone and asbestos, or soapstone alone, or other powdered mineral substance of a suitable nature, which is worked into it while it is being manufactured.

The exterior surface of this packing is covered with a glazing or coating, *a*, which may be applied by drawing the packing through a trough or box containing a paste or sizing, composed of flour-starch, potato-starch, or other suitable glutinous material that will dry rapidly, on exposure to the air, and become readily softened by the action of steam or water, and a sufficient quantity of soapstone and asbestos, (in the proportion of about five-sixths of the former to one-sixth of the latter,) or soapstone alone, or other powdered mineral substance or substances of a lubricating nature, to bring it to the required consistency.

This glazing or coating, when dry, prevents the escape of the powder contained in the packing during its transportation, which avoids loss in weight, and also renders it less dusty to handle, while, by coating the exterior surface of the packing, the powdered mineral substance is brought, as required, into immediate contact with the metallic surface to which the packing is applied, thus protecting the fibrous material, and rendering my improved packing particularly applicable in situations exposed to a great degree of heat, as, for instance, where superheated steam is used.

Figure 3:
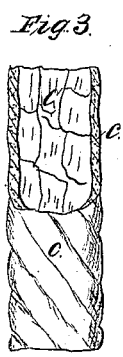

I do not confine myself to the particular mode above described of manufacturing my improved packing, as the process may be varied. For instance, a piece of packing, composed of powdered and fibrous materials, may be merely coated with a sizing or glazing of a glutinous substance, such as before described, instead of with a paste composed of glutinous and powdered substances, as first described; a piece of packing of this description being represented in fig. 2, in which B is the packing, and *b*, the glazing or sizing on its exterior surface, or a piece of ordinary packing, composed of fibrous material only, may be covered with a coating of the paste first described, composed of glutinous and powdered substances, as seen in fig. 3, C representing the fibrous material, and *c*, the coating of paste on its exterior surface.

Figure 4:

Instead of the packing being glazed or coated on its surface, as above described, the paste or sizing above mentioned, composed of glutinous and powdered substances, may be worked into the fibrous material while the packing is being braided, twisted, or plaited, a piece of packing of this description being represented in fig. 4.

The glutinous material which I employ is of such a nature that it will not interfere with the lubricating-properties of the packing, while it will dry rapidly on exposure to the air, and will be readily softened when the packing is exposed to the action of steam or water, which renders it flexible as required.

I do not claim a packing composed of a dry, powdered substance or substances and fibrous material; but What I do claim as my invention, and desire to secure by Letters Patent, is—

The application of a glazing or coating to the exterior surface of a packing, substantially as and for the purposes described.

WM. J. TOWNE.

Witnesses:
P. E. TESCHEMACHER,
W. J. CAMBRIDGE.